United States Patent
Ferrando et al.

(10) Patent No.: US 10,263,693 B2
(45) Date of Patent: Apr. 16, 2019

(54) ARCHITECTURE OF DEPLOYABLE FEED CLUSTER, COMPACT ANTENNA AND SATELLITE INCLUDING SUCH AN ARCHITECTURE

(71) Applicant: THALES, Courbevoie (FR)

(72) Inventors: Nicolas Ferrando, Tournefeuille (FR); Jérôme Brossier, Fonsorbes (FR); Jean-Christophe Lafond, Portet sur Garonne (FR); Jérôme Lorenzo, La Salvetat Saint Gilles (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/847,835

(22) Filed: Dec. 19, 2017

(65) Prior Publication Data

US 2018/0175931 A1 Jun. 21, 2018

(30) Foreign Application Priority Data

Dec. 20, 2016 (FR) .................................. 16 01813

(51) Int. Cl.
*H04B 7/185* (2006.01)
*H01Q 21/22* (2006.01)
(Continued)

(52) U.S. Cl.
CPC ......... *H04B 7/18515* (2013.01); *H01P 1/042* (2013.01); *H01P 5/024* (2013.01);
(Continued)

(58) Field of Classification Search
CPC . H04B 7/0617; H04B 7/0408; H04B 7/18578

USPC ........ 455/12.1, 562.1, 427, 429, 426.1, 431, 455/428, 552.1, 553.1, 550.1, 575.1, 455/90.1–90.3, 426.2; 342/368, 352, 359
See application file for complete search history.

(56) References Cited

U.S. PATENT DOCUMENTS 6,124,835 A * 9/2000 Nguyen ............... H01Q 1/1235
343/840
6,201,508 B1 * 3/2001 Metzen .............. H01Q 13/0258
343/776
(Continued)

FOREIGN PATENT DOCUMENTS

FR     2 374 754 A1    7/1978
JP     2009-190661 A    8/2009

OTHER PUBLICATIONS

S. Rahiminejad et al., "Polymer Gap Adapter for Contactless, Robust, and Fast Measurements at 220-325 GHz," Journal of Microelectromechanical Systems, vol. 25, No. 1, Feb. 1, 2016, pp. 160-169, XP011597857.

*Primary Examiner* — Keith Ferguson
(74) *Attorney, Agent, or Firm* — Baker & Hostetler LLP

(57) ABSTRACT

A deployable feed cluster architecture comprises a support and an array of radiofrequency RF sources, each RF source comprising a radiofrequency RF chain and of a radiating element, the RF chain being provided with input/output ports. The architecture comprises a deployable panel that is rotatably articulated about an axis of rotation, the array of RF sources mounted on the panel, the panel being rotatably movable between a first position in which the array of RF sources is stowed on the support and a second position in which the array of RF sources is deployed.

7 Claims, 10 Drawing Sheets

(51) Int. Cl.
*H01Q 21/00* (2006.01)
*H01Q 1/12* (2006.01)
*H01P 1/04* (2006.01)
*H01Q 1/08* (2006.01)
*H01Q 1/28* (2006.01)
*H01P 5/02* (2006.01)
*H01Q 19/17* (2006.01)
*H01Q 21/06* (2006.01)

(52) U.S. Cl.
CPC ............... *H01Q 1/08* (2013.01); *H01Q 1/125* (2013.01); *H01Q 1/288* (2013.01); *H01Q 21/0025* (2013.01); *H01Q 21/225* (2013.01); *H01Q 19/17* (2013.01); *H01Q 21/0006* (2013.01); *H01Q 21/064* (2013.01)

(56) References Cited

U.S. PATENT DOCUMENTS

| | | | |
|---|---|---|---|
| 6,580,399 B1* | 6/2003 | Ballinger | H01Q 1/288 343/757 |
| 2007/0200780 A1 | 8/2007 | Hentosh et al. | |
| 2010/0045563 A1* | 2/2010 | Thompson | B64G 1/222 343/881 |
| 2012/0154585 A1 | 6/2012 | Miranda | |
| 2016/0218408 A1 | 7/2016 | Saito et al. | |

* cited by examiner

ARCHITECTURE OF DEPLOYABLE FEED CLUSTER, COMPACT ANTENNA AND SATELLITE INCLUDING SUCH AN ARCHITECTURE

CROSS-REFERENCE TO RELATED APPLICATIONS

This application claims priority to foreign French patent application No. FR 1601813, filed on Dec. 20, 2016, the disclosure of which is incorporated by reference in its entirety.

FIELD OF THE INVENTION

The present invention relates to a deployable feed cluster architecture, to a compact antenna and to a satellite including such an architecture. It is applicable to any type of antenna, whether a multibeam or a single-beam antenna, including an array of RF sources, and intended to be embedded within a compact space.

BACKGROUND

Currently, antennas include radiofrequency RF sources that are mounted in a predetermined position that remains fixed over the life of the antenna. When the antenna must be fitted to a satellite, the RF sources are generally mounted on one face of the satellite. However, in the case of multibeam antennas, the RF sources are arranged in arrays of increasingly large size, which presents space problems when fitting them to satellites, in particular for launch, since the space available below the fairing of launch vehicles is limited. This space problem is particularly relevant in the case of a multibeam antenna using a large number of RF sources for multispot coverage.

To solve this problem, the known solutions consist in miniaturizing the various radiofrequency components constituting the RF sources in order to decrease the bulk thereof, the RF sources still remaining mounted in a fixed position on one face of the satellite. However, the miniaturization of RF sources is limited by minimum size conditions that must be observed for reaching desired levels of radiofrequency performance, the size conditions applying in particular to the waveguides of the RF radiofrequency chains and to the radiating horn of each RF source.

SUMMARY OF THE INVENTION

The aim of the invention is to overcome the drawbacks of the known antennas and to produce a deployable feed cluster architecture including an array of RF sources that can be stowed in a non obstructive area on the satellite and that can thus reach a larger size without presenting accommodation problems on the satellite.

To this end, the invention relates to a deployable feed cluster architecture including a support and an array of radiofrequency RF sources, each RF source consisting of a radiofrequency RF chain and of a radiating element, the RF chain being provided with input/output ports. The architecture includes a deployable panel that is rotatably articulated about an axis of rotation, the array of RF sources being mounted on the deployable panel, the deployable panel being rotatably movable between a first position in which the array of RF sources is stowed on the support and a second position in which the array of RF sources is deployed.

Advantageously, the architecture may further include contactless radiofrequency RF junctions, each RF junction consisting of two separate parts, respectively a first connecting flange mounted on the deployable panel and a second connecting flange mounted on the support, the first connecting flange being linked to an input/output port of an RF source, the second connecting flange being intended, in the second deployed position, to cooperate contactlessly with the first connecting flange in order to provide a contactless RF link.

Advantageously, the first connecting flange may include a first metal plate through which a first through orifice, is made, the second connecting flange may include a second metal plate through which a second through orifice is made and at least one of the two connecting flanges may include a plurality of transverse metal pads that are distributed periodically over the corresponding metal plate, the metal pads delimiting an RF communication channel between the first through orifice and the second through orifice when the array of RF sources is in the deployed position.

Advantageously, the first through orifice and the second through orifice are offset with respect to one another, such that the RF communication channel comprises a channel portion that is parallel to the first metal plate and to the second metal plate.

Advantageously, the first connecting flange may include a first plurality of transverse metal pads, the second connecting flange may include a second plurality of transverse metal pads, and the respective metal pads of the first and second connecting flanges of each RF junction correspond pairwise.

Advantageously, in the deployed position, for each RF junction, the first connecting flange may be placed facing the second connecting flange while leaving a clearance between the corresponding first and second connecting flanges.

The invention also relates to a compact antenna and to a satellite including such a feed cluster architecture.

BRIEF DESCRIPTION OF THE DRAWINGS

Other particularities and advantages of the invention will become apparent in the remainder of the description that is provided by way of purely illustrative and non-limiting example with reference to the appended schematic drawings, which show.

DETAILED DESCRIPTION

Figure 1:
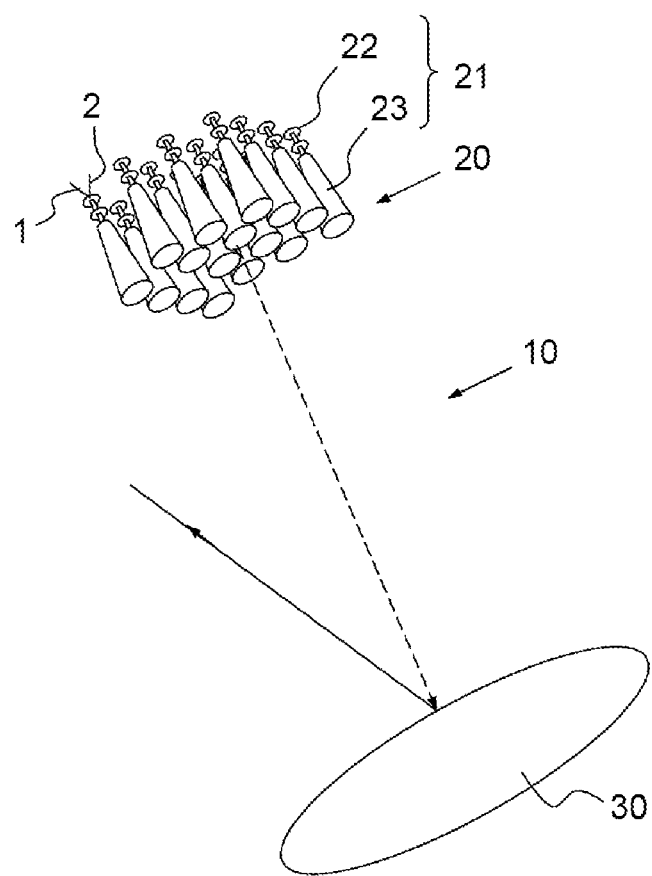
FIG. 1: a diagram of an exemplary antenna including a plurality of RF sources in the deployed position, according to the invention.
Figure 3:
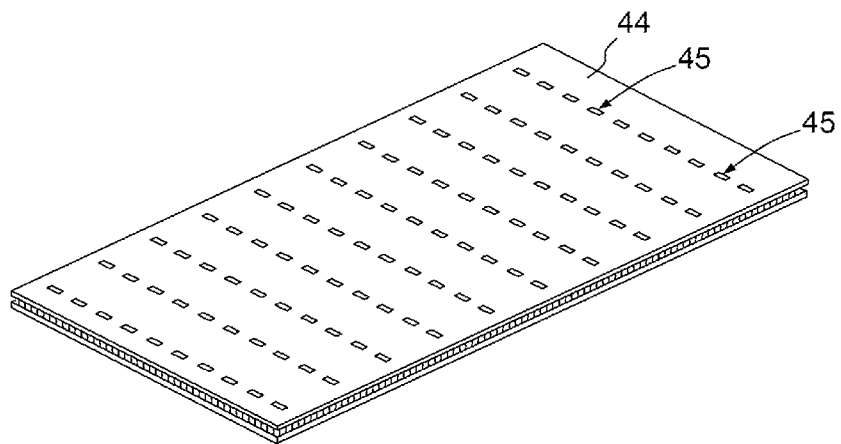
FIG. 3: a diagram, in perspective, of an exemplary arrangement of the input/output ports of the RF sources in the second area of a deployable panel, according to the invention.
Figure 4:
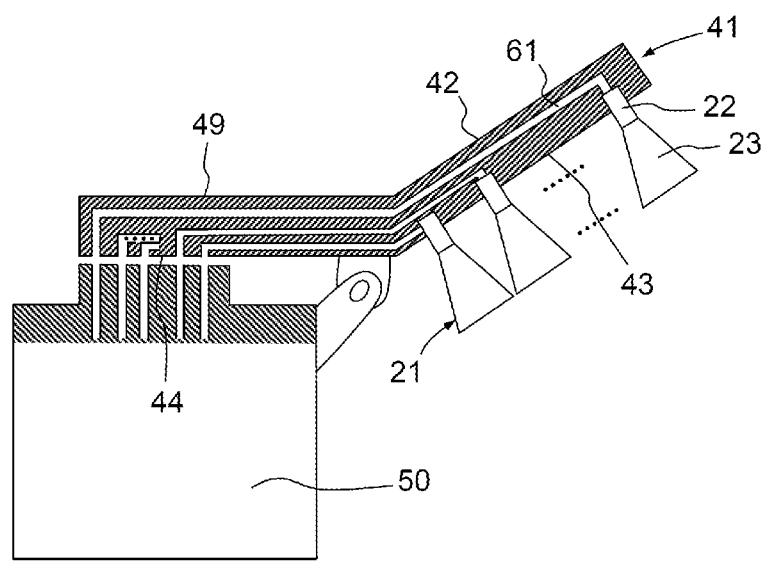
FIG. 4: a diagram of an exemplary arrangement of the RF sources on a deployable panel, according to the invention.

The antenna 10 shown in FIG. 1 includes an array 20 of multiple radiofrequency RF sources 21 placed in front of a reflector 30. Each RF source 21 consists of an RF chain 22 and a radiating element 23 that is connected to the RF chain, the radiating element potentially being, for example, a horn. Each RF chain includes input/output ports 1, 2 that are intended to be linked to a signal transmitting and receiving device. According to the invention as shown for example in FIGS. 2a and 2b, the feed cluster architecture includes a first part that is rotatably movable about an axis of rotation 40 and a second, static part that is mounted on a support 50, the first part being intended, in a stowed position, to be distanced from the second part and, in an operating position, to cooperate with the second part in order to provide radiofrequency links. The first part of the feed cluster architecture consists of a deployable panel 41 in which the RF sources 21 are arranged. The deployable panel 41 includes two separate areas, the first area 42 including a radiating surface 43 on which the radiating horns 23 of all of the RF sources are arranged and the second area 49 including a connecting surface 44 on which first connecting flanges, shown in detail in the examples illustrated in FIGS. 5a, 5b, 6a, 6b, 7a, 7b, 8, are arranged, which flanges are linked to the respective input/output ports of the RF sources via waveguides 61 that are shown in FIG. 4. Each input/output port 1, 2 is in fact linked to a first connecting flange that is capable of cooperating with a second connecting flange, which is complementary to the first connecting flange, in order to provide an RF junction between the corresponding RF source 21 and a transmitting/receiving device 60 mounted on the support 50. As shown in FIG. 3, the first connecting flanges 45 that are associated with the input/output ports of the various sources RF may, for example, be arranged side by side on the connecting surface 44, in a two-dimensional matrix. As shown for example in FIG. 4, the RF chains 22 of the various RF sources are incorporated within the panel 41 and linked to the waveguides 61 that are routed through the interior of the deployable panel from the radiating horns 23 to the corresponding first connecting flanges. The panel 41 may for example consist of a machined metal plate. The second, static part of the feed cluster architecture consists of the support 50 and of a connecting plate in which the second connecting flanges are arranged, the connecting plate 51 being attached to the support 50.

According to the invention, the deployable panel 41 is articulated about an axis of rotation 40 and is rotatably movable between a first position in which the feed cluster is stowed on the support 50 and a second position in which the feed cluster is deployed. To allow the deployable panel 41 to rotate, as shown for example in FIGS. 2a and 2b, the axis of rotation 40 may be the axis of a shaft mounted in fittings 73, 74 that are rigidly connected to the support 50 and to the panel 41, respectively. In the stowed position, the deployable panel may be locked to the support by means of a first locking device 75. After unlocking the deployable panel, the feed cluster is deployed by a mechanism for rotating the panel (not shown), the rotary mechanism potentially being, for example, an electric rotary actuator that is rigidly connected to the shaft or a passive driving mechanism such as a spring for example. A second locking device (not shown) may be used to lock the feed cluster in the deployed position. An electric rotary actuator has the advantage of providing, on its own, a rotary guiding function and a rotary driving function. Is also possible to use an electric rotary actuator including a fixed-step motor, for example a stepper motor, and, in this case, the second locking device is not essential and may be omitted. Conversely, in the case of using a passive rotary mechanism, the rotary mechanism must be combined with a rotary guiding device, for example bearings or a ball joint or any other rotary guiding device.

As shown in FIGS. 5a, 5b, 6a, 6b, 7a, 7b, to provide radiofrequency connections between each RF source 21 and a signal transmitting/receiving device 60 that is mounted on the support 50, the feed cluster architecture includes, in the deployed position, contactless radiofrequency RF junctions, each RF junction consisting of a first connecting flange 45 mounted on the panel 41 and a second connecting flange 46 mounted on the connecting plate 51 that is attached to the support 50, the second connecting flange 52 being complementary to the first connecting flange 45. In the first stowed position, for each RF source 21, the second connecting flange 52 is distanced from the first connecting flange 45 and no RF communication may be established between the RF sources 21 and the transmitting/receiving device 60. In the second deployed position, for each RF source 21, the second connecting flange 52 is positioned facing the first connecting flange 45 while leaving a clearance 59 between the two corresponding flanges 45, 52. In the deployed position, the first connecting flange 45 and the second connecting flange 52 cooperate with one another contactlessly and provide a contactless RF link between the corresponding RF source 21 and the signal transmitting/receiving device 60 that is mounted on the support 50.

Figure 5A:
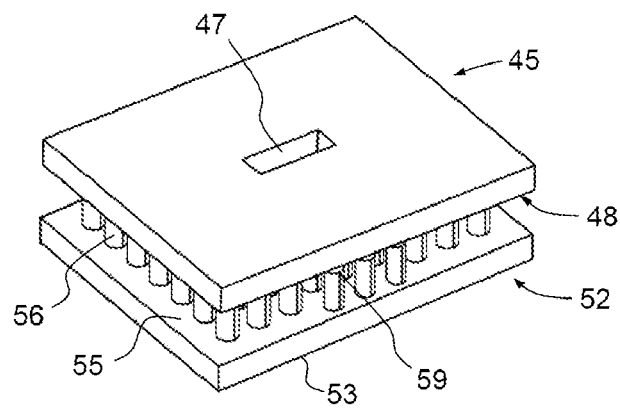
FIGS. 5a and 5b: two diagrams, in the deployed position and in the stowed position, respectively, of a first exemplary contactless RF junction, according to the invention.
Figure 5B:
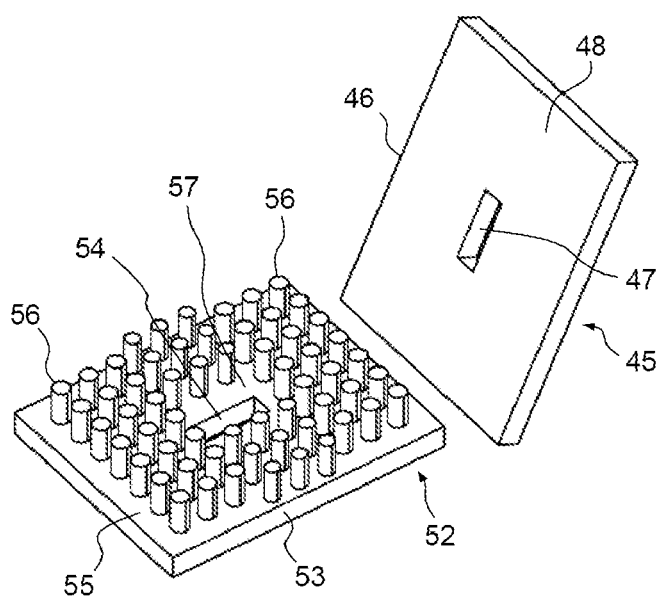
Figure 6A:
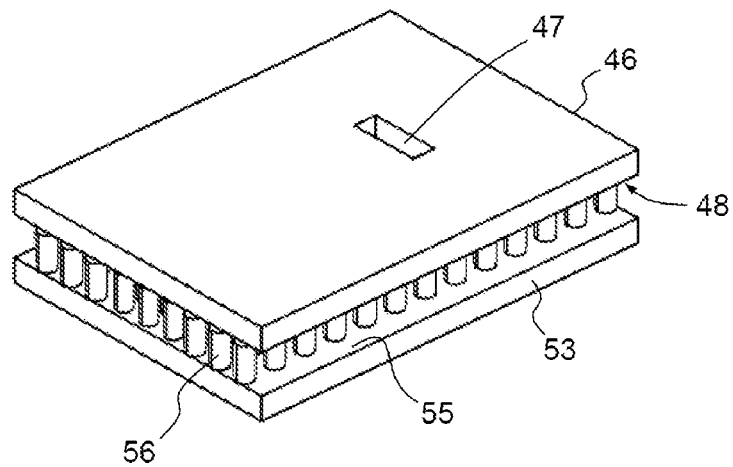
FIGS. 6a and 6b: two diagrams, in the deployed position and in the stowed position, respectively, of a second exemplary contactless RF junction, according to the invention.
Figure 6B:
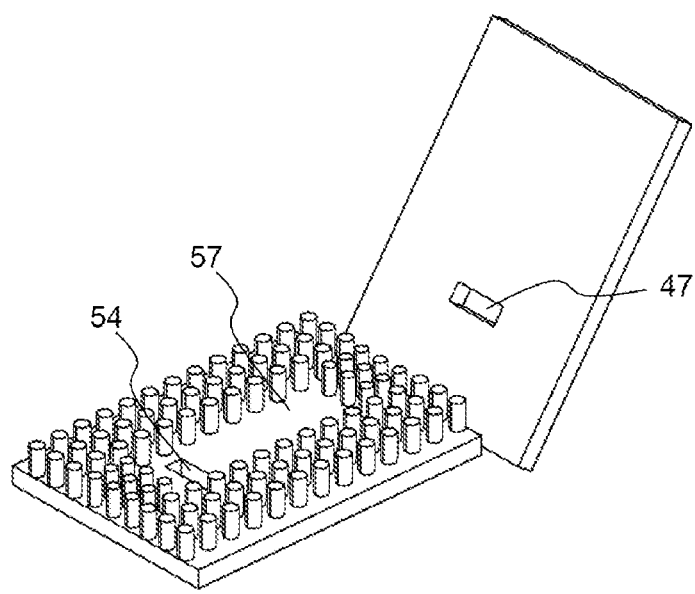
Figure 7A:
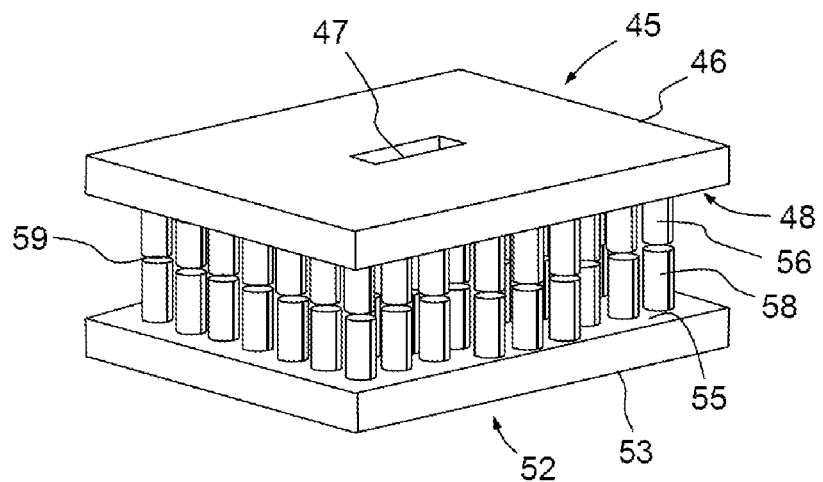
FIGS. 7a and 7b: two diagrams, in the deployed position and in the stowed position, respectively, of a third exemplary contactless RF junction, according to the invention.
Figure 7B:
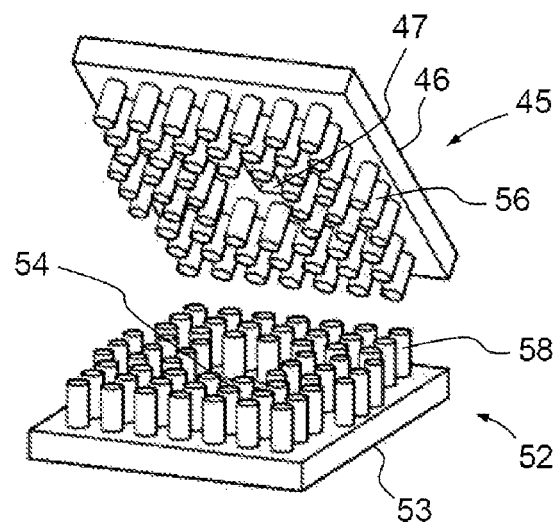
Figure 8:
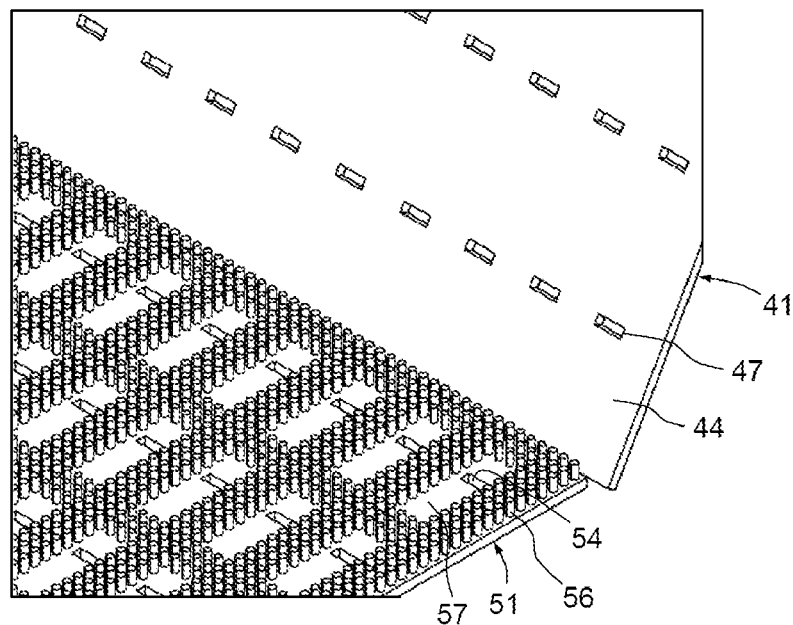
FIG. 8: a detail diagram, illustrating an exemplary matrix arrangement of multiple RF junctions, according to the invention.

Three exemplary RF junctions in accordance with the invention are shown in FIGS. 5a, 5b, 6a, 6b, 7a, 7b. In FIGS. 5a, 6a, 7a, The RF junction is in the operating position, the two connecting flanges 45, 52 of the RF junction being placed facing one another but without contact between them, which corresponds to the deployed position of the panel 41. In FIGS. 5b, 6b, 7b, the two connecting flanges 45, 52 of the RF junction are distanced from one another, which corresponds to the stowed position, or to an intermediate position during deployment, of the panel 41. The first connecting flange 45 of the RF junction includes a first metal plate 46 through which a first through orifice 47 is made, which opening is connected to an input/output port 1, 2 of an RF source 21. The second connecting flange 52 of the RF junction includes a second metal plate 53 through which a second through orifice 54 is made, which opening is intended to be linked to the transmitting/receiving device 60. In the first example illustrated in FIGS. 5a and 5b, and in the second example shown in FIGS. 6a and 6b, only one of the two metal plates, for example the second metal plate 53, of the RF junction includes an inner face 55 provided with a plurality of transverse metal pads 56 that are distributed periodically around the corresponding through orifice 54.

Alternatively, the metal pads may be arranged on the inner surface 48 of the first connecting flange. In an operating position, the two connecting flanges 45, 52 of the RF junction are placed facing one another while leaving a clearance 59 between the two connecting flanges such that there is no contact between the two connecting flanges 45, 52 of the RF junction. When the RF source array is in the deployed position, the metal pads 56 form electromagnetic walls delimiting an RF communication channel 57 that is located at the center of the RF junction, the RF communication channel 57 linking the first opening 47 and the second opening 54 of the RF junction, the RF channel including no metal pads. The first opening 47 and the second opening 54 of an RF junction may be made facing one another as in the FIGS. 5a, 5b, or be longitudinally offset with respect to one another as shown in the second exemplary RF junction illustrated in FIGS. 6a and 6b. If the two openings of the RF junction are made facing one another, the RF channel 57 is perpendicular to the two metal plates 46, 53 of the RF junction. If the two openings 47, 54 of the RF junction are longitudinally offset with respect to one another, the RF channel 57 includes a channel portion that is parallel to the two metal plates 46, 53 of the RF junction. The two openings 47, 54 of the RF junction are said to be longitudinally offset whenever they are not made facing one another, and whenever the channel 57 comprises a channel portion that is parallel to the two metal plates 46, 53 of the RF junction. This longitudinal offset allows the tolerance on the relative positioning of the two metal plates 46, 53 to be increased. In the first example illustrated in FIGS. 5a and 5b and in the second example illustrated in FIGS. 6a and 6b, the metal pads are arranged on only one of the two metal plates of the RF junction. The metal pads have the advantage of channeling the electromagnetic waves while limiting leakages. Furthermore, since the first and second connecting flanges facing one another do not make contact, the RF junctions exhibit good thermal decoupling.

Alternatively, the metal pads may be arranged on both metal plates 46, 53 of the RF junction, as shown in the third example illustrated in FIGS. 7a and 7b. In this third example, the first and the second metal plate 46, 53 of the RF junction include a respective inner face 48, 55 provided with a plurality of transverse metal pads 56, 58 that are distributed periodically around the corresponding through orifice 47, 54. In a deployed position, the metal pads 56, 58 of the two connecting flanges 45, 52 of the RF junction correspond pairwise while leaving a clearance 59 between the two connecting flanges 45, 52 such that the pads 56 of the first connecting flange 45 do not make contact with the pads 58 of the second connecting flange 52. The metal pads 56, 58 may for example be produced by molding or by means of an additive manufacturing process.

Since the feed cluster includes an array of multiple RF sources, a large number of RF junctions are required to produce all of the connections between the input/output ports of the RF chains of each RF source and the transmitting/receiving device 60. According to the invention, all of the RF junctions required for the connections of all of the RF sources may be arranged in a two-dimensional matrix as shown in the partial view illustrated in FIG. 8, in which the first and the second connecting flanges of the RF junctions are separated and distanced from one another. The first connecting flanges are arranged on the deployable panel 41 and the second connecting flanges are arranged on a connecting plate 51 that is rigidly connected to the support 50. Each RF junction has a structure that is in accordance with the examples illustrated in FIGS. 5a and 5b, but of course the RF junctions may alternatively include a structure that is in accordance with the examples illustrated in FIGS. 6a and 6b or with the examples illustrated in FIGS. 7a and 7b. Using a structure that is in accordance with the examples illustrated in FIGS. 6a and 6b is advantageous when manufacturing the deployable panel 41 and the connecting plate 51. Specifically, the longitudinal offset, in each RF junction, of the opening 47 facing the opening 54 provides a tolerance in the relative positioning of the deployable panel 41 with regard to the connecting plate 51. Furthermore, this offset allows a tolerance in the positioning of the opening 47 in the deployable panel 41, as well as in the positioning of the opening 54 in the connecting plate 51, to be obtained.

The support 50 of the feed cluster architecture may, for example, consist of the body of a satellite. Various configurations of the feed cluster architecture are shown in the stowed position in FIGS. 2a, 9a, 10a and 11a, and in the deployed position in FIGS. 2b, 9b, 10b, 11b.

Figure 9A:
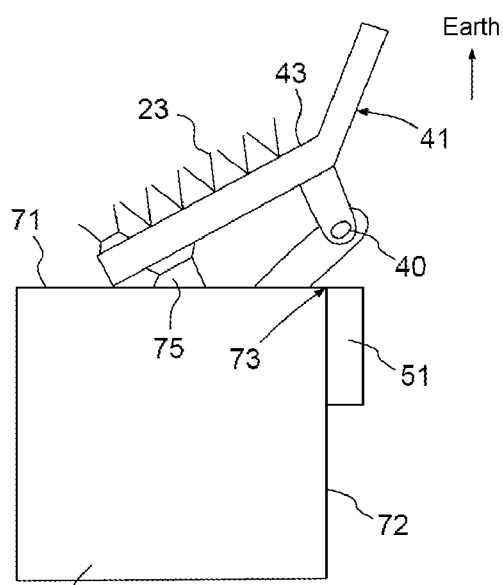
FIGS. 9a and 9b: two diagrams, in cross section, of a second exemplary configuration of a feed cluster architecture, in the stowed position and in the deployed position, respectively, according to the invention.
Figure 9B:
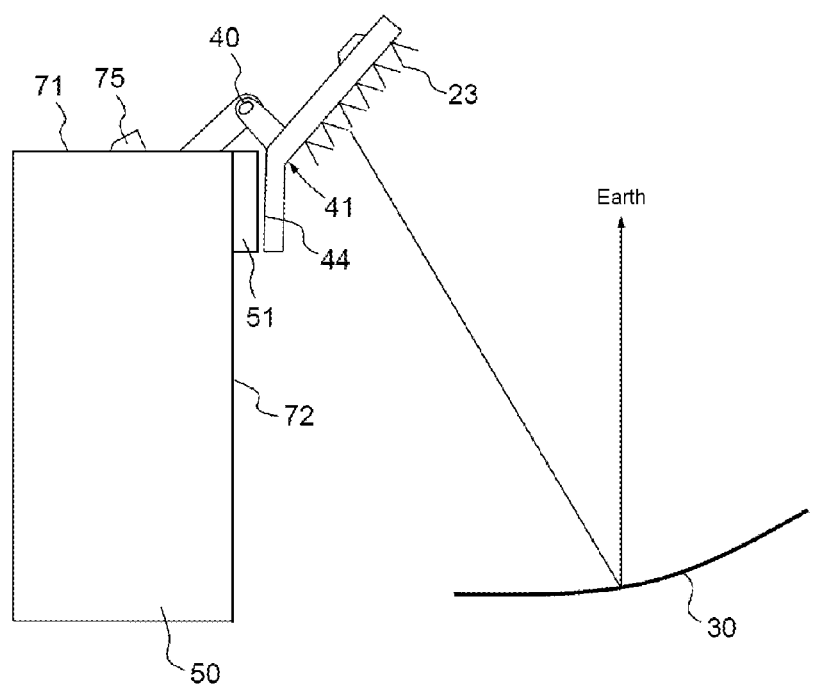

In FIGS. 9a and 9b, in the stowed position, the panel 41 is locked by a locking device 75 that is attached to a first face 71 of a satellite 50, for example a face oriented toward Earth, referred to as the Earth face. The radiating horns 23 of the RF sources are arranged on a front surface 43 of the panel 41, the first connecting flanges are arranged on a connecting surface 44 that is located on a back surface of the panel 41 and the second connecting flanges are mounted on the connecting plate 51 that is mounted on a second face 72 of the satellite 50, the second face 72 potentially being, for example, a lateral face. After unlocking, the panel 41 tilts in rotation about the axis of rotation 40 until the first connecting flanges mounted on the panel 41 are positioned facing the second connecting flanges mounted on the second face 72. In this configuration, the axis of rotation 40 of the panel 41 is located at the level of the edge 73 of the body of the satellite 50, which edge is located between the first face 71 and the second face 72.

Figure 2A:
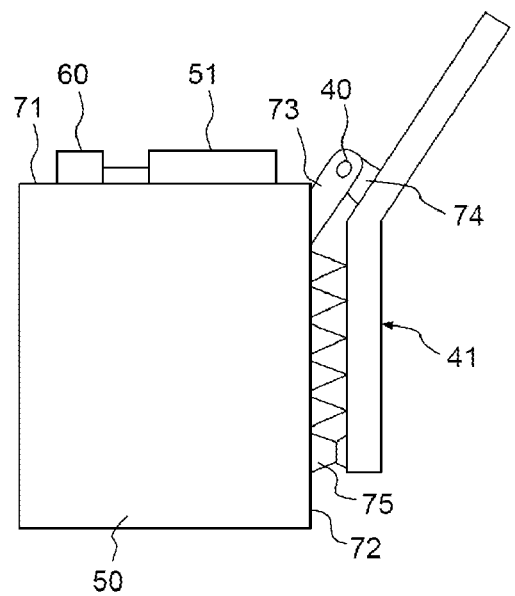
FIGS. 2a and 2b: two diagrams, in cross section, of a first exemplary configuration of a feed cluster architecture, in the stowed position and in the deployed position, respectively, according to the invention.
Figure 2B:
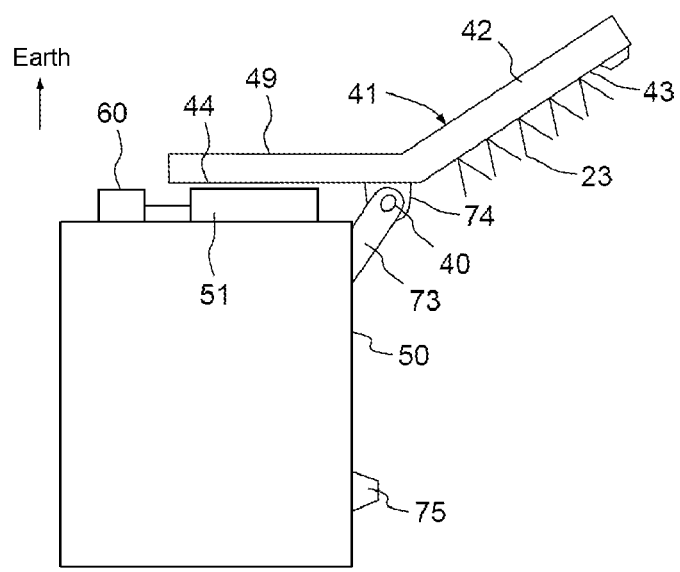

FIGS. 2a and 2b correspond to an inverted configuration with respect to the configuration of FIGS. 9a and 9b, the panel 41 in the stowed position being locked to the second face 72 corresponding to a lateral face of the satellite. The radiating horns 23 and the first connecting flanges of the RF sources are mounted on a front surface 43 of the panel 41 and the second connecting flanges are mounted on the connecting plate 51 that is mounted on the first face 71 of the satellite 50 that is oriented toward Earth.

Figure 10A:
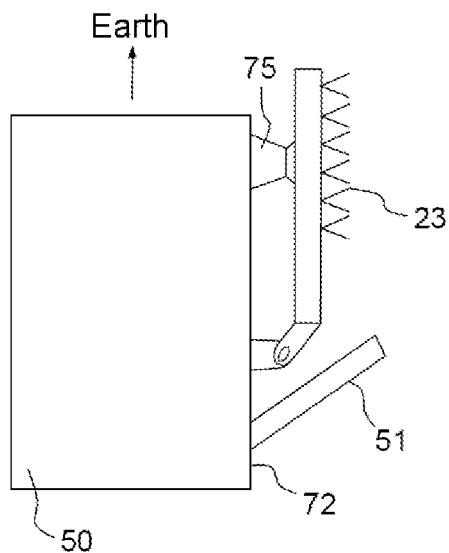
FIGS. 10a and 10b: two diagrams, in cross section, of a third exemplary configuration of a feed cluster architecture, in the stowed position and in the deployed position, respectively, according to the invention.
Figure 10B:
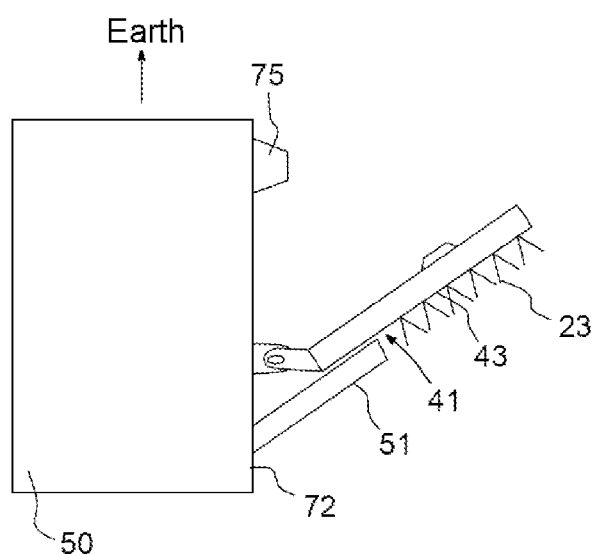

In FIGS. 10a and 10b, the radiating horns 23 and the first connecting flanges of the RF sources are arranged on a front surface 43 of the panel 41 and the second connecting flanges are mounted on a connecting plate 51 that is attached obliquely to the second face 72 that is oriented toward Earth. In the stowed position, the panel 41 is locked to the second face 72 that is oriented toward Earth by the locking device 75. After unlocking, the panel 41 tilts in rotation until the first connecting flanges mounted on the panel 41 are positioned facing the second connecting flanges mounted on the connecting plate 51 that is attached obliquely to the second face 72.

Figure 11A:
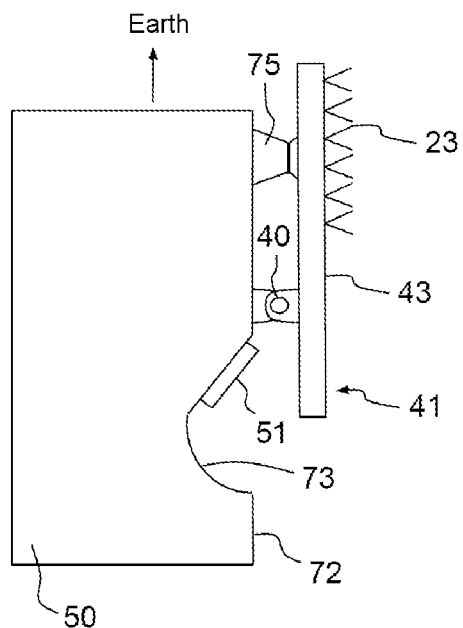
FIGS. 11a and 11b: two diagrams, in cross section, of a fourth exemplary configuration of a feed cluster architecture, in the stowed position and in the deployed position, respectively, according to the invention.
Figure 11B:
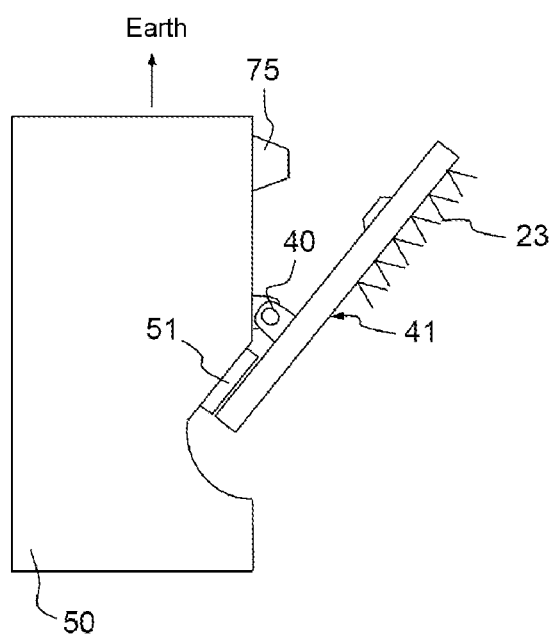

In FIGS. 11a and 11b, the radiating horns 23 of the RF sources are arranged on a front surface 43 of the panel 41, the first connecting flanges are arranged on a back surface of the panel 41 and the second connecting flanges are mounted on the connecting plate 51, the connecting plate 51 being attached in a recess 73 in the second face 72 corresponding to a lateral face of the satellite 50. After unlocking, the panel 41 tilts in rotation until the first connecting flanges mounted on the panel 41 are positioned facing the second connecting flanges mounted on the connecting plate 51 attached in the recess 73.

Although the invention has been described in conjunction with particular embodiments, it is clearly evident that it is in no way limited thereto and that it comprises all of the technical equivalents of the described means, as well as combinations thereof if the latter fall within the scope of the invention.

The invention claimed is:

1. A deployable feed cluster architecture comprising:
   a support;
   an array of radiofrequency RF sources, each RF source comprising a radiofrequency RF chain and a radiating element, the RF chain being provided with input/output ports;
   a deployable panel that is rotatably articulated about an axis of rotation, the array of RF sources being mounted on the panel, the panel being rotatably movable between a first position in which the array of RF sources is stowed on the support and a second position in which the array of RF sources is deployed; and
   contactless radiofrequency RF junctions, each RF junction comprising two separate parts, respectively a first connecting flange mounted on the panel and a second connecting flange mounted on the support, the first connecting flange being linked to an input/output port of an RF source, the second connecting flange being intended, in the second deployed position, to cooperate contactlessly with the first connecting flange in order to provide a contactless RF link.

2. The feed cluster architecture as claimed in claim 1, wherein
   the first connecting flange includes a first metal plate in which a first through orifice is made,
   the second connecting flange includes a second metal plate in which a second through orifice is made, and
   at least one of the two connecting flanges includes a plurality of transverse metal pads that are distributed periodically over the corresponding metal plate, the metal pads delimiting an RF communication channel between the first through orifice and the second through orifice when the array of RF sources is in the deployed position.

3. The feed cluster architecture as claimed in claim 2, wherein the first through orifice and the second through orifice are offset with respect to one another, such that the RF communication channel comprises a channel portion that is parallel to the first metal plate and to the second metal plate.

4. The feed cluster architecture as claimed in claim 2, wherein
   the first connecting flange includes a first plurality of transverse metal pads,
   the second connecting flange includes a second plurality of transverse metal pads, and
   the respective metal pads of the first and second connecting flanges of each RF junction correspond pairwise.

5. The feed cluster architecture as claimed in claim 2, wherein, in the deployed position, for each RF junction, the first connecting flange is placed facing the second connecting flange while leaving a clearance between the corresponding first and second connecting flanges.

6. A compact antenna, wherein it comprises a deployable feed cluster architecture as claimed in claim 1.

7. A satellite, wherein it comprises a deployable feed cluster architecture as claimed in claim 1, the support consisting of a face of the satellite.

* * * * *